United States Patent [19]

Ogawa et al.

[11] Patent Number: 4,618,469

[45] Date of Patent: Oct. 21, 1986

[54] FLAME-RETARDANT ACRYLIC FIBERS AND PROCESS FOR PREPARING SAME

[75] Inventors: Takahiro Ogawa, Kobe; Masahiko Takada, Akashi; Takaharu Matsumoto, Takasago; Youichi Kanbara, Kakogawa, all of Japan

[73] Assignee: Kanegafuchi Kaguku Kogyo Kabushiki Kaisha, Osaka, Japan

[21] Appl. No.: 607,476

[22] Filed: May 7, 1984

[30] Foreign Application Priority Data

May 6, 1983 [JP] Japan .................................. 58-79799
May 10, 1983 [JP] Japan .................................. 58-82296

[51] Int. Cl.$^4$ .......................... C08K 3/16; C08K 5/09; C08K 3/30; C08K 3/10
[52] U.S. Cl. ..................................... 264/182; 524/429; 524/430; 524/434; 524/422; 524/399
[58] Field of Search ............... 524/422, 429, 430, 434, 524/827, 784, 178, 399; 264/182; 526/342

[56] References Cited

U.S. PATENT DOCUMENTS

| | | | |
|---|---|---|---|
| 2,648,647 | 8/1953 | Stanton et al. | 524/783 |
| 3,194,862 | 7/1965 | Coover et al. | 264/182 |
| 3,376,254 | 4/1968 | Logemann et al. | 524/434 |
| 3,410,819 | 11/1968 | Kourtz et al. | 524/434 |
| 3,642,628 | 2/1972 | Palethorpe | 524/178 |
| 3,899,473 | 8/1975 | Johansson | 524/786 |
| 3,907,932 | 9/1975 | Kennedy et al. | 524/178 |
| 3,907,958 | 9/1975 | Tsuji et al. | 524/434 |
| 4,002,426 | 1/1977 | Chenevey et al. | 264/182 |
| 4,007,232 | 2/1977 | Yamazaki et al. | 524/434 |
| 4,022,750 | 5/1977 | Takeya et al. | 524/178 |
| 4,041,144 | 8/1977 | Obara et al. | 524/434 |
| 4,044,072 | 8/1977 | Touval | 524/434 |

FOREIGN PATENT DOCUMENTS 4620880 12/1967 Japan .

Primary Examiner—Veronica P. Hoke
Attorney, Agent, or Firm—Sughrue, Mion, Zinn, Macpeak, and Seas

[57] ABSTRACT

The present invention discloses a flame-retardant acrylic synthetic fiber comprising acrylonitrile and a vinyl monomer copolymerizable therewith and containing a finely divided inorganic tin compound. The fiber has high flame retardancy, outstanding gloss and transparency, and satisfactory whiteness and dyeability.

16 Claims, No Drawings

FLAME-RETARDANT ACRYLIC FIBERS AND PROCESS FOR PREPARING SAME

BACKGROUND OF THE INVENTION

The present invention relates to novel acrylic synthetic fibers having high flame retardancy and outstanding gloss and transparency.

While so-called modacrylic fibers comprising a relatively large amount of copolymerized vinyl halide are flame-retardant to some extent in themselves, it is desired to provide more flame-retardant fibers to meet the rapidly increasing needs of the community for flame retardancy which are urged, for example, by recent hotel fires. Flame retardancy is imparted to fibers by copolymerizing a flame-retardant monomer with a material for forming fibers, by admixing a flame retardant to a spinning solution and spinning the mixture, by depositing a flame retardant on fibers by aftertreatment, and by other methods. Of these methods, it is general practice to admix a flame retardant with a spinning solution because this method gives semi-permanent flame retardancy to the fiber without greatly impairing the original properties of the fiber. Various flame retardants are known which include halides containing chlorine, bromine or the like, compounds containing nitrogen and phosphorus, and metal compounds, but only a few of them are effective for giving flame retardancy to acrylic synthetic fibers. Of these, tin oxide, antimony oxide, magnesium oxide and like metal oxides are relatively useful for imparting flame retardancy to acrylic synthetic fibers, whereas these oxides have the drawback of being insoluble in solvents and therefore giving only fibers which are very low in transparency and have an impaired quality. Such metal oxides have another drawback of requiring an increased pressure for filtering the spinning solution and being liable to clog up the nozzle in the course of fiber making process. Thus, it is extremetly difficult to develop acrylic synthetic fibers which are highly flame-retardant and satisfactory in both gloss and transparency.

SUMMARY OF THE INVENTION

An object of the present invention is to provide acrylic synthetic fibers having high flame retardancy, outstanding in gloss and transparency and satisfactory in whiteness and dyeability.

Another object of the present invention is to provide a process for preparing acrylic synthetic fibers having high flame retardancy and outstanding gloss and transparency almost without necessitating an increased pressure for filtering the spinning solution and substantially free of troubles such as clogging of the spinning nozzle.

Other objects and advantages of the present invention will become apparent from the following description.

DETAILED DESCRIPTION OF THE INVENTION

The present invention provides a flame-retardant acrylic fiber characterized in that the fiber is prepared from a polymer comprising acrylonitrile and a vinyl monomer copolymerizable therewith and that the fiber contains an inorganic tin compound having an average particle size of up to 100 m$\mu$, preferably up to 50 m$\mu$, more preferably up to 20 m$\mu$. The invention further provides a process for preparing an acrylic synthetic fiber characterized by admixing a tin compound with the reaction mixture obtained by subjecting acrylonitrile and a vinyl monomer copolymerizable therewith to polymerization in an aqueous system, separating the polymer from the aqueous system along with the compound or a reaction product thereof, purifying the separated mixture, mixing the product with a solvent for the polymer and spinning the resulting mixture.

The term "average particle size" herein used means a volume average particle size obtained by cubing the diameter of a circle corresponding to the image of each of inorganic tin compound particles observable under a transmission electron microscope, totaling the cubed values of all the particles, dividing the sum and calculating the cubic root of the quotient. When a particle is an aggregated particle, the aggregated particle is regarded as a unit particle, from which the average particle size is calculated. The term "aggregated" means that primary particles are physically in contact with each other.

The acrylic synthetic fibers of the invention, like usual acrylic synthetic fibers, are useful not only for various fiber products but also for goods which must be highly flame-retardant, such as curtains, carpets and like interior goods, toys and like articles for children, nightclothes and like articles for aged adults and hospital bedclothes. The present fibers are further suited for human or animal hair-like filaments, yarns, bedclothes, garments, high-pile fabrics, etc. which preferably have high gloss, transparency and dyeability and good hand.

The synthetic fibers of the invention are acrylic synthetic fibers prepared from a polymer as the base material. The polymer primarily comprises acrylonitrile. Preferably the polymer is a copolymer comprising 30 to 70% by weight (hereinafter stated merely as %) of acrylonitrile, 70 to 30% of a halogen-containing vinyl monomer and 0 to 10% of a vinyl monomer copolymerizable with these components. The halogen-containing vinyl monomer herein mentioned is at least one monomer selected, for example, from among vinyl chloride, vinylidene chloride, vinyl bromide, vinylidene bromide, etc. Examples of copolymerizable vinyl monomers are acrylic acid, methacrylic acid, salts or esters of such acids, acrylamide. methylacrylamide, vinyl acetate, etc. Preferably at least one of the copolymerizable vinyl monomers to be used is a vinyl monomer containing a sulfonic group. Examples of such monomers are methallylsulfonic acid, styrenesulfonic acid, salts thereof, etc.

Examples of inorganic tin compounds useful for the present invention are tin halides, tin oxyhalides, stannic acid or salts thereof, tin salts of inorganic acids and derivatives of these compounds. Such compounds are stannous and stannic compounds. The inorganic tin compound contained in the fiber has an average particle size of up to 100 m$\mu$, preferably up to 50 m$\mu$, more preferably up to 20 m$\mu$. The tin compound is contained in the fiber preferably in an amount of 0.1 to 8%, more preferably 0.3 to 5%, in terms of metallic tin content. However, even when the average particle size is within the foregoing range, care should preferably be taken so as to minimize the content of the particles of inorganic tin compound larger than 100 m$\mu$. If the metallic tin content is less than the above-mentioned range, insufficient flame retardancy will result, whereas greater tin contents adversely affect the gloss and transparency.

The polymer serving as the base material of the fiber according to the invention is prepared by polymerization in an aqueous system, preferably by emulsion polymerization. Although it is desired to admix the tin compound with the polymerization reaction mixture simultaneously with or after the completion of the polymerization, the tin compound may be wholly or partially admixed with the reactant materials before or during polymerization unless the kind or amount of the compound is seriously detrimental to the polymerization reaction. Organic tin compounds i.e., tin salts of organic acids, when used, are also effectively serviceable as flame retardants if the compound can be incorporated into the fiber in the form of an inorganic tin compound. Nevertheless, even if compounds other than tin compounds are used for the acrylic fiber in the process of the invention, the compound will not be incorporated into the fiber as fine particles of desired size or will result in reduced gloss and transparency, or the fabric prepared from the resulting fiber will not have useful flame retardancy although the fiber has a great oxygen index. Thus the tin compounds of the invention generally achieve the best result.

Preferred as such tin compounds are water-soluble tin compounds which become a gel-like precipitate or colloidal fine particles when treated with an acid or alkali for pH adjustment or reaction or when diluted or reacted with water. Preferably the tin compound is admixed, as dissolved in water, with the polymerization reaction mixture uniformly and thoroughly. The tin compound may be in the form of a gel-like precipitate or colloidal fine particles and mixed with water or some other additive before being admixed with the reaction mixture, or the compound may be a powder and admixed with the reaction mixture, or a mixture of at least two tin compounds may be admixed with the reaction mixture, insofar as the tin compound(s) can be mixed with the polymerization reaction mixture uniformly and thoroughly. Whatever method is resorted to, it is desirable to admix the compound in the form of a dilute aqueous solution or mixture, provided that the compound used does not adversely affect the production process, although the method is not limited particularly. When the tin compound is admixed as an aqueous solution or mixture, the particle size of the inorganic tin compound incorporated in the fiber finally obtained is smaller if the concentration of the aqueous solution or mixture is lower. Accordingly it is desired that the aqueous solution or mixture of tin compound be up to 30%, preferably up to 15%, in concentration.

Before or after the tin compound is admixed with the polymerization reaction mixture, the mixture is adjusted to a pH of 1 to 8, preferably 3 to 7, and the polymer and the tin compound are thereafter separated from the aqueous system and purified by a method of aftertreatment which is usually used for aqueous polymerization reaction mixtures. The pH adjustment thus effected is desirable in view of the yield of the tin compound and removal of impurities and by-products. If the pH is lower excessively, the process will involve the problem of corrosion, whereas if it is exceedingly higher, the polymer becomes colored.

The polymer containing the tin compound and thus obtained is mixed with a solvent for the polymer, such as acetone, acetonitrile, dimethylformamide, dimethylacetamide, or dimethyl sulfoxide, and with additives for giving improved peroperties to fibers. The mixture is spun by the usual wet method, dry method or the like, affording a fiber having the desired properties.

Investigations have yet to be made to fully clarify why the fibers of the present invention which contain an inorganic tin compound as fine as up to 100 m$\mu$ in average particle size have surprisingly high gloss, transparency and flame retardancy. Presumably the outstanding properties are attributable to the fact that since the tin compound or reaction product thereof in the form of very fine particles is uniformly present in the polymerization reaction mixture when the mixture is separated and treated for purification, the tin compound or reaction product remains in the fine particulate state without agglomeration or forming larger particles and is deposited on the surfaces of the polymer particles or incoroporated in the interior thereof when the polymer particles agglomerate or become larger. Consequently the fine particles of the inorganic tin compound can be present in the fibers also as uniformly dispersed therein without impeding transmission of light, further permitting the compound to have a large surface area to function very effectively as a flame retardant.

When the polymer is one prepared from acrylonitrile and a vinyl monomer copolymerizable therewith by polymerization in an aqueous system, the tin compound is admixed with the reaction mixture most preferably after the polymerization but before the removal of water. However, the tin compound may be added, for example, to the spinning solution, although this is not an optimum case because the fiber then obtained tends to be made opaque by boiling water and therefore to lose transparency during dyeing.

Fibers of the present invention were tested for the evaluation of flame retardancy by the following oxygen index method.

Twenty-five inch lengths of filaments, 5400 denier in combined fineness, were twisted 75 times into a string, and two such strings were made into a rope-like specimen by twisting 45 times reversely. The specimen was heat-treated at 170° C. for 5 minutes and then held upright to the holder of an oxygen index tester. The oxygen percent required for the specimen to burn continuously over a length of 5 cm was measured. The higher the oxygen index value, the higher is the flame retardancy. Based on the oxygen index, and the mode of burning and the state of burnt specimen observed, the flame retardancy of the specimen was evaluated generally according to the following criteria.

A: Excellent
B: Good
C: Low
D: Very low (almost no flame retardancy)

For the determination of the transparency of fibers, the fiber sample was dissolved in dimethylformamide to prepare a 5% solution. The light transmittance of a 1-cm-thick layer of the solution was measured at a wavelength of 650 m$\mu$ by a spectrophotometer. The measurement was expressed in percentage relative to the transmittance of dimethylformamide which is 100. The gloss and transparency of the sample were evaluated generally according to the same criteria as above.

The metallic tin content was determined by measuring the tin content of the sample in the usual manner by the atomic absorption method.

The present invention will be described in greater detail with reference to the following examples and comparative examples. The examples of the invention are given for illustrative purposes only and are in no way limitative.

EXAMPLE 1, COMPARATIVE EXAMPLES 1-2

Acrylonitrile (hereinafter referred to merely as "AN"), vinylidene chloride (VD), vinyl chloride (VC) and sodium methallylsulfonate (SMS) were subjected to emulsion polymerization with use of 0.3% aqueous solution of sodium laurylsulfate and ammonium persulfate.

A specified quantity of 10% aqueous solution of tin tetrachloride was admixed with 5 kg of the reaction mixture (polymer content: 22%; composition of polymer: 48.2% AN, 31.0% VD, 19.7% VC and 1.1% SMS). The mixture was adjusted to a pH of 6 with use of caustic soda, followed by salting-out with common salt and washing to obtain a polymer.

The polymer was admixed with acetone to a concentration of 30% and then heated to prepare a spinning solution, which was extruded into 25% aqueous solution of acetone through a spinning nozzle having 300 holes with a diameter of 0.1 mm without a pressure buildup or clogging. The extrudates were washed with water and drawn in the usual manner to obtain 3-denier filaments (Example 1).

For comparison (Comparative Example 1), the polymer alone was separated from the polymerization reaction mixture of Example 1 without addition of tin tetrachloride and was formulated into a spinning solution, from which filaments were prepared. In Comparative Example 2, metastannic acid was added to the spinning solution of Comparative Example 1 in such an amount that the filaments subsequently prepared had the same metallic tin content as the filaments of Example 1.

The filaments were evaluated with the results given in Table 1.

TABLE 1

|  | Metallic tin Content in fiber (%) | Average particle size of tin compd. in fiber (mμ) | Flame retardancy | | Gloss, Transparency | |
|---|---|---|---|---|---|---|
|  |  |  | Oxygen index | Evaluation | Transmittance (%) | Evaluation |
| Example 1 | 0.86 | 15 | 35.8 | A | 70 | A |
| Comp. Ex. 1 | 0 | — | 32.0 | C | 90 | A |
| Comp. Ex. 2 | 0.86 | 1500 | 35.4 | A | 13 | D |

Table 1 shows that the fiber of Example 1 contains a tin compound having a very small average particle size and is excellent not only in flame retardancy but also in gloss and transparency. Moreover, the fiber is excellent in general fiber characteristics such as whiteness and dyeability.

On the other hand, the fiber of Comparative Example 1 is low in flame retardancy as expected although having high gloss and transparency. Conversely the fiber of Comparative Example 2, which is a conventional flame-retardant fiber, has high flame retardancy but is very low in transparency because the flame retardant has large particle sizes and therefore renders the fiber opaque.

EXAMPLES 2-7, COMPARATIVE EXAMPLES 3-8

The same emulsion polymerization as in Example 1 was carried out to obtain a polymerization reaction mixture containing 20% of a polymer comprising 56.0% AN, 42.9% VD and 1.1% SMS.

With 5-kg-portions of the reaction mixture was admixed a mixture of 10% stannous chloride and water in such amounts that the fibers subsequently prepared therefrom had the metallic tin contents listed in Table 2. The mixtures were adjusted to a pH of 4 with caustic soda, and polymers were salted out. The polymers were dissolved in dimethylfromamide and then spun (Examples 2-7).

In Comparative Examples 3 to 8, varying amounts of metastannic acid were added to a spinning solution prepared from the same reaction mixture as above to which, however, no stannous chloride was added. The resulting mixtures were spun in the same manner as above. Table 2 shows the results.

TABLE 2

|  | Metallic tin content in fiber (%) | Average particle size of tin compd. in fiber (mμ) | Flame retardancy | | Gloss, Transparency | |
|---|---|---|---|---|---|---|
|  |  |  | Oxygen index | Evaluation | Transmittance (%) | Evaluation |
| Example 2 | 7.22 | 18 | 40.2 | A | 51 | B-C |
| Example 3 | 3.60 | 15 | 37.8 | A | 55 | B |
| Example 4 | 1.51 | 15 | 36.0 | A | 64 | A-B |
| Example 5 | 0.77 | 13 | 35.7 | A | 83 | A |
| Example 6 | 0.35 | 12 | 34.0 | A | 88 | A |
| Example 7 | 0.15 | 10 | 33.2 | B | 92 | A |
| Comp. Ex. 3 | 7.22 | 1400 | 38.5 | A | — | D |
| Comp. Ex. 4 | 3.60 | 1300 | 37.9 | A | — | D |
| Comp. Ex. 5 | 1.51 | 1700 | 36.1 | A | 5 | D |
| Comp. Ex. 6 | 0.77 | 1600 | 35.5 | A | 17 | D |
| Comp. Ex. 7 | 0.35 | 1500 | 33.8 | A | 37 | D |
| Comp. Ex. 8 | 0.15 | 1400 | 33.3 | B | 48 | C |

The fibers of Examples 2 to 7 are satisfactory in gloss, transparency and flame retardancy, whereas in the case of Comparative Examples wherein a conventional method of affording flame retardancy is resorted to, the flame retardancy improves but the gloss and transparency conversely reduce with an increase in the amount of metastannic acid added. Accordingly it is difficult to assure the desired properties by the conventional method. Comparison between Examples and Comparative Examples in respect of the average particle size of tin compound in the fiber reveals that the tin compound in the fibers of the invention is exceedingly smaller in particle size, contributing a great deal especially to the gloss and transparency.

EXAMPLES 8-15

Filament samples were prepared from the polymerization reaction mixture of Example 1 by admixing different tin compounds therewith in such an amount that each resulting fiber contained 0.7% of the tin compound calculated as metallic tin. Table 3 shows the results.

Table 3 indicates that each fiber is excellent in gloss and transparency.

TABLE 3

|  | Tin compound added | Average particle size of tin compd. in fiber (mμ) | Gloss, Transparency evaluation |
|---|---|---|---|
| Example 8 | Stannous chloride dihydrate | 12 | A |
| Example 9 | Stannic chloride | 15 | A |
| Example 10 | Stannic bromide | 15 | A |
| Example 11 | Potassium α-stannic acid | 17 | A |
| Example 12 | Sodium α-stannic acid | 18 | A |
| Example 13 | Stannic nitrate | 16 | A |
| Example 14 | Stannic sulfate | 18 | A |
| Example 15 | Stannic acetate | 19 | A |

What we claim is:

1. A flame-retardant acrylic fiber as defined in claim 1, wherein said fiber is prepared by the process comprising: (1) preparing a reaction mixture comprising acrylonitrile and a vinyl monomer copolymerizable therewith in an aqueous system, (2) carrying out polymerization, wherein a water-soluble tin compound is admixed with said reaction mixture prior to, during and/or after polymerization, (3) separating the resulting polymer and tin compound from the aqueous system, (4) purifying the separated mixture of polymer and tin compound, (5) mixing the resulting product with a solvent for the polymer and (6) spinning the resulting mixture to form said fiber, said tin compound being present in the fiber in an amount sufficient to impart flame retardancy and having an average particle size of up to 100 mμ.

2. A flame-retardant acrylic fiber as defined in claim 1 wherein the inorganic tin compound has an average particle size of up to 50 mμ.

3. A flame-retardant acrylic fiber as defined in claim 1 or 2 wherein the polymer comprises 30 to 70% by weight of acrylonitrile, 70 to 30% by weight of a halogen-containing vinyl monomer and 0 to 10% by weight of a vinyl monomer copolymerizable with said components.

4. A flame-retardant acrylic fiber as defined in claim 1 or 2 which contains the inorganic tin compound in an amount of 0.1 to 8% by weight in terms of metallic tin content.

5. A flame-retardant acrylic fiber as defined in claim 1 wherein the aqueous-system polymerization is emulsion polymerization.

6. A flame-retardant acrylic fiber as defined in claim 1, wherein the tin compound is admixed with the reaction mixture after polymerization.

7. A flame-retardant acrylic fiber as defined in claim 1, wherein said tin compound is an inorganic tin compound selected from the group consisting of tin oxyhalides, stannic acid, salts of stannic acid and tin salts of inorganic acids, or tin salts of organic acids.

8. A process for preparing an acrylic synthetic fiber comprising: (1) preparing a reaction mixture comprising acrylonitrile and a vinyl monomer copolymerizable therewith in an aqueous system, (2) carrying out polymerization, wherein a water-soluble tin compound is admixed with said reaction mixture prior to, during and/or after polymerization, (3) separating the resulting polymer and tin compound from the aqueous system, (4) purifying the separated mixture of polymer and tin compound, (5) mixing the resulting product with a solvent for the polymer and (6) spinning the resulting mixture to form said fiber, said tin compound being present in the fiber in an amount sufficient to impart flame retardancy and having an average particle size of up to 100 mμ.

9. A process as defined in claim 8 wherein the polymer comprises 30 to 70% by weight of acrylonitrile, 70 to 30% by weight of a halogen-containing vinyl monomer and 0 to 10% by weight of a vinyl monomer copolymerizable with these components.

10. A process as defined in claim 8 or 9 wherein at least one of the copolymerizable vinyl monomers is a vinyl monomer containing a sulfonic group.

11. A process as defined in claim 8 wherein the aqueous-system polymerization is emulsion polymerization.

12. A process as defined in claim 8 wherein the tin compound is admixed with the reaction mixture in an amount of 0.1 to 8% by weight in terms of metallic tin content based on the polymer.

13. A process as defined in claim 8 wherein the separating step is performed after adjusting the aqueous system to a pH of 3 to 7.

14. A process as defined in claim 8 or 12 wherein the tin compound is an inorganic tin compound.

15. A process for preparing an acrylic synthetic fiber in claim 8, wherein said tin compound is an inorganic tin compound selected from the group consisting of tin oxyhalides, stannic acid, salts of stannic acid or tin salts of inorganic acids, or tin salts of organic acids.

16. The process as claimed in claim 8, wherein the tin compound is admixed with the reaction mixture after polymerization.

* * * * *